Aug. 15, 1967   H. D. KUGLER   3,335,888
MATERIAL HANDLER
Filed March 29, 1965
2 Sheets-Sheet 1
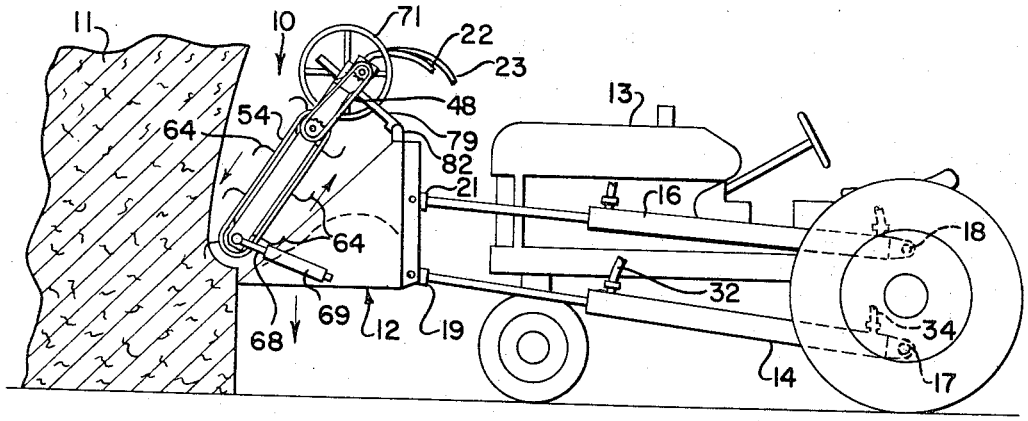
FIG. 1
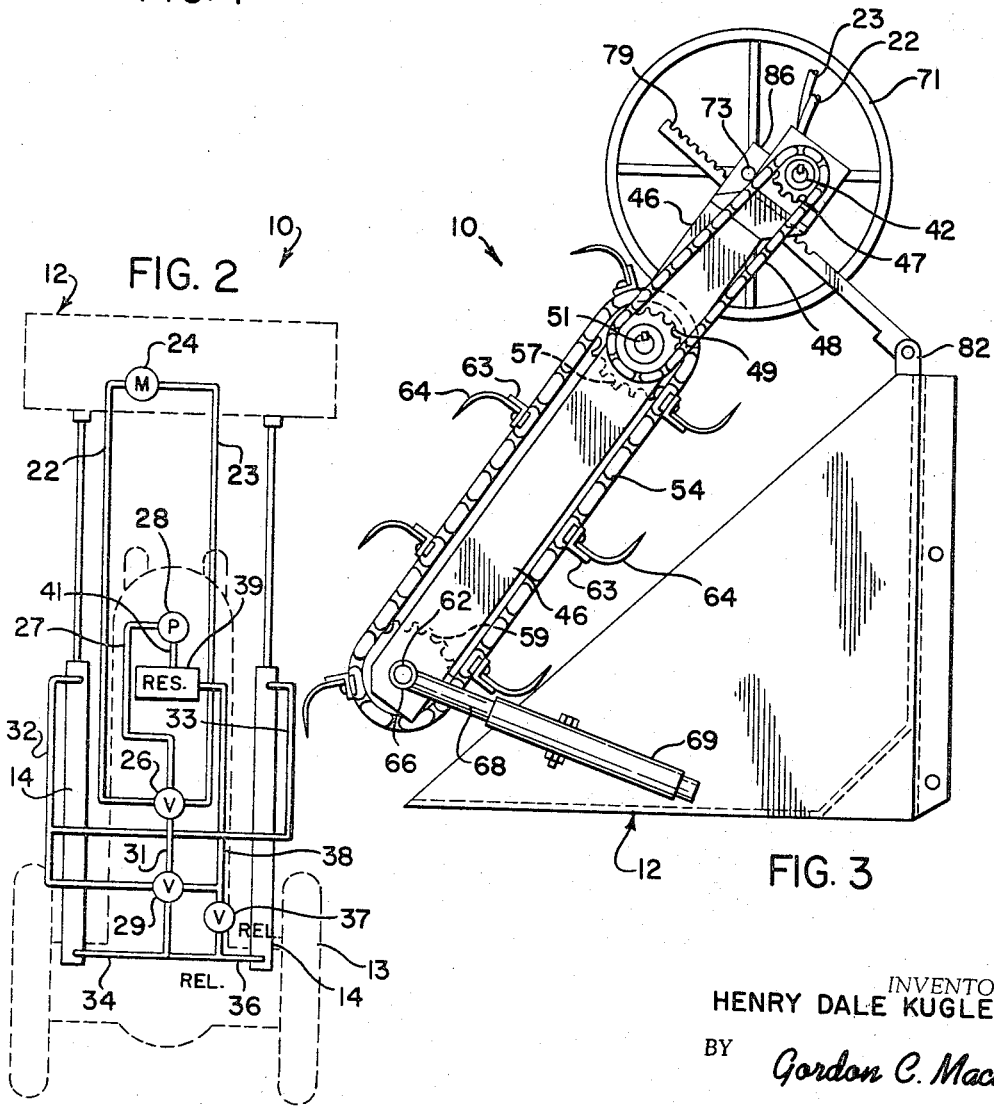
FIG. 2
FIG. 3
INVENTOR.
HENRY DALE KUGLER
BY Gordon C. Mack
ATTORNEY

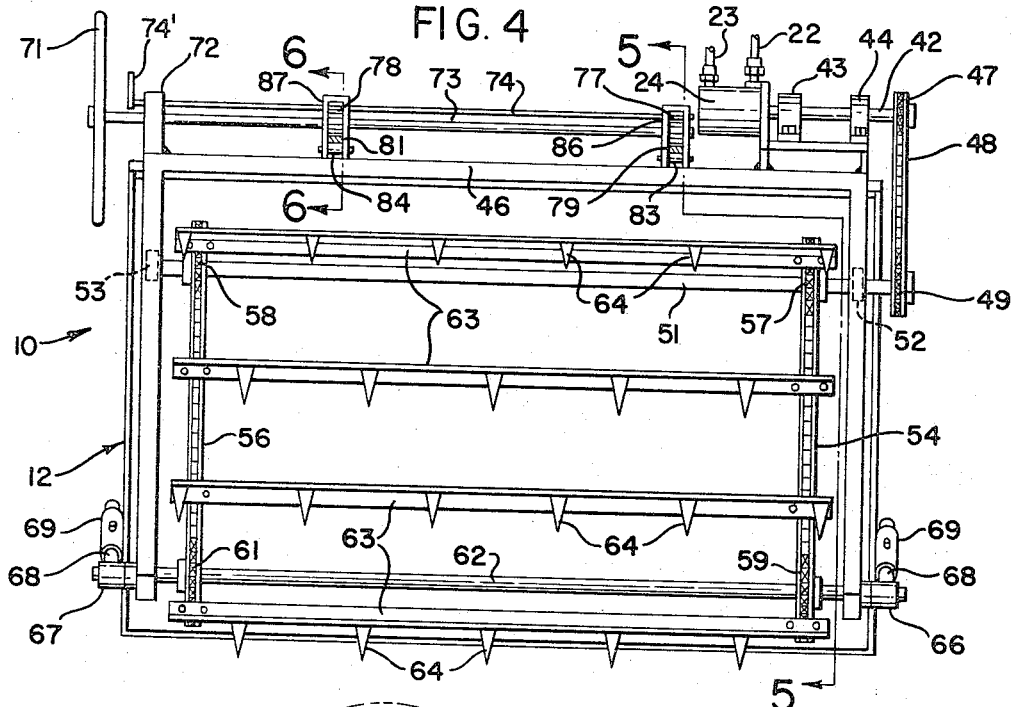
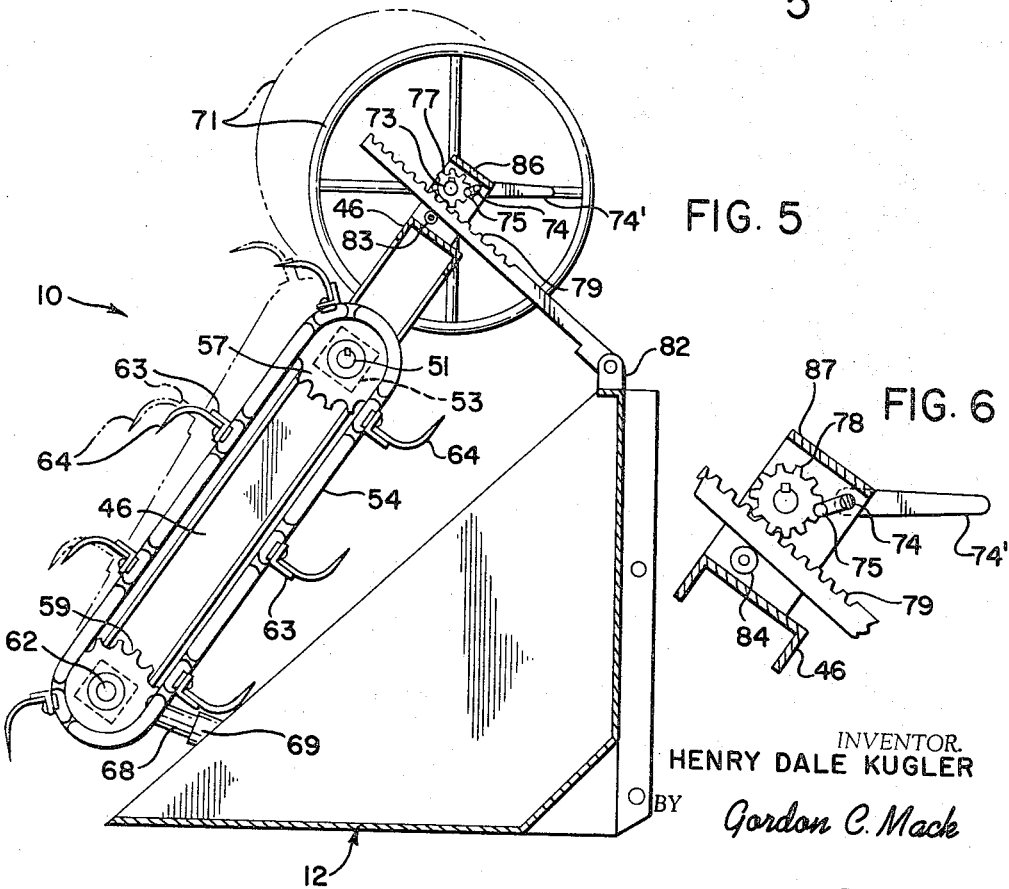
INVENTOR.
HENRY DALE KUGLER
BY Gordon C. Mack
ATTORNEY

United States Patent Office
3,335,888
Patented Aug. 15, 1967

1

3,335,888
MATERIAL HANDLER
Henry Dale Kugler, Rte. 2, Box 118,
Cozad, Nebr. 69130
Filed Mar. 29, 1965, Ser. No. 443,271
6 Claims. (Cl. 214—509)

The material handler of this invention is designed particularly to load and unload ensilage material, especially for the removal of ensilage material from an above-ground or bunker-type silo, and then after transportation to the desired destination, it is designed to unload the ensilage material. However, the handler may be used for loading and unloading ground hay and other feed materials, etc.

This handling equipment includes rake means and a bucket into which the ensilage is loaded. The bucket is attached to a loader which may be mounted on any suitable vehicle such as a tractor or truck, etc.

The bucket may be of any usual design, and the design of the rake is not critical. However, the mounting is important. The front of the rake is pivotally mounted adjacent the bottom of the bucket and the rear of the rake is mounted so that it can be positioned at different distances above the bucket. This enables an operator to load an estimated amount of the ensilage into the bucket without weighing it. The bucket may be of any size. In a large bucket, if the rear of the rake is elevated high above the bucket it may be possible to load a thousand pounds of ensilage, for example, by piling the ensilage up in the bucket. If a smaller amount is desired, such as for example 500 pounds, the rear of the rake is lowered and then the bucket will be loaded to a level height. Any intermediate amount of the ensilage material can be loaded into the bucket by adjusting the position of the rear of the rake at an intermediate level. Regardless of the position of the rear of the rake, any excess will be drawn by the rake over the rear of the bucket if the operator does not stop the operation of the rake before there is any overflow.

The handling equipment of this invention is mounted on a truck or tractor or the like by a hoist such as a hydraulic hoist which adjusts the bucket for loading and unloading and also adjusts the height of the bucket above the ground. In the loading position the bottom of the bucket is horizontal, or substantially so, and the rake is moved so that the tines on the lower span of the rake move from the front of the bucket rearwardly and upwardly. After the bucket has been loaded it is transported to a truck or wagon or the like, and then the bucket is tipped so that the bottom is in a vertical position, or nearly so. For unloading, the rake is moved in the opposite direction.

The invention is further described in connection with the accompanying drawings, in which:

FIGURE 1 is a schematic side elevation, showing the loader attached to a farm tractor;

FIGURE 2 is a schematic plan view of FIGURE 1, showing the hydraulic lines for operating the loader;

FIGURE 3 is an enlarged side elevation of the loader, detached from the tractor;

FIGURE 4 is a front elevation of FIGURE 3;

FIGURE 5 is a section on the line 5—5 of FIGURE 4; and

FIGURE 6 is a detail on the line 6—6 of FIGURE 4.

Referring first to FIGURES 1 and 2, the loader 10 is shown loading ensilage 11 in a dump bucket 12. The bucket is attached to a conventional farm tractor 13 by elevating cylinders 14 and dump cylinders 16. The cylinders are mounted and pivot on the tractor frame at 17 and 18 and are mounted to the bucket by clevises 19 and 21. The bucket may be mounted in any suitable manner.

2

Suitable fluid lines 22 and 23 power a hydraulic motor 24 by means of a four-way valve 26 connected by line 27 to a pump 28 that operates off the tractor engine or in any other conventional manner. The four-way valve 26 is connected to a second four-way valve 29 by connecting line 31 and this valve operates the ram cylinders 14 by lines 32, 33, 34 and 36. A relief valve 37 is shown connected to line 36 by conduit 38 leading from line 36 to reservoir 39. Reservoir 39 is connected in turn to pump 28 by conduit 41.

It is desirable in practice when loading ensilage to work from the top of the pile down by slowly bleeding off relief valve 37. This allows the loader to drop at an even rate. The operator will stop the downward movement when the desired amount of ensilage has been loaded into the bucket. Then the bucket is moved to a wagon or other receiver and the ensilage is dumped into it.

Referring to FIGURES 3 to 6, the shaft 42 of the motor 24 is journaled in pillow blocks 43 and 44 mounted on frame 46. Keyed to said shaft 42 is a drive sprocket 47 which drives chain 48 and in turn drives sprocket 49 keyed to the rake shaft 51. The motor 24 may be mounted to take up slack in said chain 48 in any suitable manner, not shown. The shaft 51 is journaled in frame 46 by suitable bearings 52 and 53 (FIGURE 4) that may be adjustable to take up slack in the rake chains 54 and 56. These chains are driven from shaft 51 by sprockets 57 and 58. The sprockets 59 and 61 mesh with the chains and idle over shaft 62 that is mounted in frame 46. Mounted on the rake chains 54 and 56 in any suitable manner, such as by rivets or bolts, are a plurality of angles 63 supporting thereon a plurality of spiked raking tines 64. These may be mounted in any desirable position on said angles and in any suitable manner such as by welding or bolting. Any suitable chain mechanism may be used to which means is attached for moving the ensilage.

The shaft 62 extends through the frame 46. It is located almost exactly above the lip of the bottom of the bucket. The shaft is held in journals 66 and 67. Ordinarily it does not move in these journals except as the top of the rake is adjusted with respect to the bucket. The journals are fastened to shafts 68 which are held rigidly in sleeves 69 which are welded to the bucket.

The rake may be pivoted about shaft 62 to any desired angle (as explained more particularly in connection with FIGURE 5) by turning handwheel 71 mounted near ear 72 on the shaft 73. Shaft 73 has keyed thereon pinions 77 and 78 meshing with racks 79 and 81 that are mounted by means of clevises 82 to the top of the bucket. The racks are kept in engagement with said pinions by idler rollers 83 and 84 journaled in brackets 86 and 87 welded to said frame 46.

Any suitable brake means may be used to lock the pinions so that the rear of the rake is held at any desired level above the bucket. The brakes shown are swivelly mounted on the rod 74 which is rotatably held in the brackets 86 and 87 and is equipped at the end with a handle 74′. Fastened to the rod 74 adjacent each pinion is a short length of rod 75. When the handle 74′ is raised the short lengths 75 mesh with the teeth of the pinions and prevent the pinions from rotating. This locks the rake at a desired level. When the handle 74′ is lowered the short lengths 75 are removed from engagement with the pinions and the pinions are then free to rotate.

The foregoing describes a particular embodiment of the invention. It is obvious that other means may be used. In loading, the bottom of the bucket which is above the ground is relatively horizontal and the shaft 62 is almost immediately above the lip of this bottom so that the ensilage is moved into the bite between the rake and this lip. The rear of the rake is adjusted, as explained, to provide for the loading of a larger or smaller amount of the ensilage. After loading the vehicle on which the bucket is mounted, moves the load to a truck or other destination. Here the bottom of the bucket is dropped to a substantially vertical position, the direction of the rake is reversed by turning valve 26 and the ensilage is unloaded.

The equipment may be used for other materials, as desired.

The invention is covered in the claims which follow.

What I claim is:

1. The combination of supporting means and a material handler which includes (1) a bucket which is above the ground when being loaded, the bucket being mounted on the supporting means by means adapted to move the bucket between a position in which its bottom is substantially horizontal when loading and a position in which the bottom is lowered to a substantially vertical position when unloading, and (2) a continuous rake which comprises upper and lower spans, which rake is mounted over the bucket with means for moving the lower span away from the front of the bucket, with the front of the rake pivotally attached adjacent the front of the bucket and with the rear of the rake supported from the bucket by means adapted to position it at different distances above the back of the bucket, the rake being composed of spiked tines which are curved to the rear when in the lower span of the rake.

2. The combination of claim 1 in which the means for adjusting the position of the bucket is hydraulic.

3. The combination of claim 1 in which the means for adjusting the distance of the rear of the rake above the bucket is manual.

4. The combination of claim 1 in which the rake is supported in a frame and means for supporting and adjusting the rear of the rake is two racks the lower ends of which are pivotally fastened to the rear of the bucket and mesh with pinions on a shaft mounted on the frame, the shaft being provided with a handwheel for operating the pinions, and brake means for fastening the pinions at any desired location along the racks.

5. The combination of claim 1 in which the front of the rake is supported by a shaft almost immediately above the lip of the bottom of the bucket when the bottom is in a horizontal position.

6. The combination of supporting means and a material handler which includes (1) a bucket, the bucket being mounted on the supporting means by means adapted to move the bucket between a position in which its bottom is substantially horizontal and a position in which the bottom is lowered to a substantially vertical position, and (2) a continuous rake mounted over the bucket with the front thereof pivotally attached adjacent the lip of the bottom of the bucket and with the rear of the rake supported from adjacent the rear of the bucket by means adapted to position it at different distances above the bucket, the rake being supported by a frame comprising two racks, the lower ends of the racks being pivotally fastened to the rear of the bucket and meshed with pinions on a shaft mounted on the frame, the shaft being provided with a hand-wheel for operating the pinions, and brake means for fastening the pinions at any desired location along the racks.

References Cited

UNITED STATES PATENTS

| | | | |
|---|---|---|---|
| 2,464,098 | 3/1949 | Pittlick | 37—8 |
| 2,791,041 | 5/1957 | Hancock | 37—8 |
| 3,191,322 | 6/1965 | Johnson et al. | 37—8 |

GERALD M. FORLENZA, *Primary Examiner.*

ALBERT J. MAKAY, *Examiner.*